Patented Nov. 9, 1943

2,333,862

UNITED STATES PATENT OFFICE 2,333,862

HEAT EXCHANGE MATERIAL

Lyle O. Hill and Leland W. Short, Chicago, Ill., assignors to The American Dairy Cattle Club, Chicago, Ill., a corporation of Illinois No Drawing. Original application January 12, 1942, Serial No. 426,488. Divided and this application January 18, 1943, Serial No. 472,734

9 Claims. (Cl. 252—70)

This invention relates to a heat exchange material and has for an object the provision of a substance which may be used in association with a suitable container for the preservation of physiological or biological specimens at a desired predetermined temperature for an indefinite period of time.

In the temporary storage and transportation of certain physiological or biological specimens such as animal semen, bacterial cultures, enzymatic preparations, and the like, it is necessary that they be maintained at temperatures somewhat below room temperature but without freezing so that the physiological properties thereof do not become impaired. The problem of economically maintaining small specimens of animal semen at optimum preserving temperatures has become particularly acute in recent years due to the practice of shipping small quantities of this material to various parts of the country for use in the artificial insemination of cattle and other live stock. In the past it has been necessary to ship or transport specimens of animal semen in relatively large refrigerating units so that the temperature thereof might be maintained substantially constant during the period of shipment. This practice has been quite expensive and the workers in the field have been searching for some means whereby the semen may be shipped in relatively small packages within which it may be maintained at a constant preserving temperature for reasonable periods and until such time as it is ready for use. It has been discovered that the temperature of small quantities of a specimen may be maintained substantially constant for an indefinite period of time if the specimen is placed in heat exchange relationship with a solid material undergoing a change of state at a temperature at which it is desired to preserve the specimen. In our co-pending application, Serial No. 411,462, filed September 19, 1941, now Patent No. 2,315,425, we have disclosed a container comprising a vacuum bottle filled with a heat exchange material which has a melting point at that temperature at which it is desired to preserve the semen or other physiological specimen. The heat exchange material is first solidified by extracting the heat therefrom and the specimen is inserted into the container in heat exchange relationship with the fusible material in the vacuum bottle and the temperature of the specimen will remain at that temperature at which the heat exchange material melts for periods of 25 to 100 hours or even longer, depending upon temperature differentials, the amount of heat exchange fluid that is contained within the vacuum bottle, the latent heat of fusion of said heat exchange material, the conductivity of the heat exchange material, the construction of the vacuum bottle, and the size of the receptacle for receiving the specimen within the bottle. A container has thus been provided which will be entirely satisfactory for the temporary storage and shipment of physiological specimens which must be maintained at predetermined substantially constant temperatures.

In our above referred to application we have disclosed several substances which may be used in the vacuum container as the heat exchange material for maintaining the specimen at any desired predetermined temperature. We have there suggested that such materials as formic acid, acetic acid, bromoform, and the like may be used. We have also indicated that certain mixtures of compounds and preferably eutectic mixtures could be employed if desired.

In the storage and shipment of specimens in containers of the type indicated generally above, it is important that the heat exchange fluid have a high latent heat of fusion so that unnecessarily large quantities of heat exchange fluid are not necessary to maintain a given temperature for a desired length of time. It has been discovered that certain of the amines have high latent heats of fusion which make them particularly useful as a heat exchange material. In the preservation of animal semen it is necessary that the specimens thereof be maintained at a temperature between about 32° and about 50° F. so that the physiological activity of the semen will not become impaired during storage or shipment. Certain of the liquid amines with which we have worked and which we have found to be particularly desirable, however, have a melting point above these temperature limits. We have, however, discovered that certain compounds may be added to these amines in order to depress the melting or fusion temperatures thereof whereby to produce eutectic mixtures having melting temperatures which remain substantially constant within narrow limits during the change of state of the mixture from a solid to a liquid state. By proper selection of an amine and a compound dissolved therein for producing a eutectic mixture, it is possible to produce a great variety of heat exchange materials which have any desired melting point. Amines that have been found to be useful for the formation of the eutectic mixtures of this invention are ethylene diamine and monoethanolamine. Ethylene diamine is particularly useful for the reason that it has a latent heat of fusion of about 77 calories per gram. It is clear that a large number of compounds may be dissolved in these amines in order to lower the melting temperature thereof to the range at which it is desired to preserve the specimen in the container with which the heat exchange material is associated. However, it is important to select a compound which will form a eutectic mixture with the amine so that a heat exchange material will be produced which will have a melting or fusion temperature lower than the melting point of the amine but which, at the same time, will maintain its low melting point throughout the period of time during which it is undergoing its change of state. It is possible by proper selection to determine which compounds will form eutectic mixtures with these amines and which will not. Any of those compounds that will produce a desired eutectic mixture which has a melting point within the desired range is, of course, satisfactory. Examples of compounds that may be dissolved in the above indicated amines for producing eutectic mixtures having a melting point between about 32° and about 50° F. are urea, sodium iodide, and sodium nitrite.

We have determined that ethylene diamine has a molal freezing point constant between about 1.3° and 1.7° C. and probably about 1.5° C. This means that, when one mol of any solute is dissolved in 1000 grams of ethylene diamine, the freezing point of the resulting ethylene diamine solution is depressed about 1.5° C. (2.7° F.). Likewise if two mols of any solute are dissolved in 1000 grams of ethylene diamine, then the freezing point of the solution is lowered by about twice as much or about 3.0° C. (5.4° F.). It is known that eutectic solutions must, of necessity, be saturated solutions at the freezing temperature in order that a eutectic mixture of solvent crystals and solute crystals will separate out at the same time and at a substantially constant temperature during freezing. In accordance with this invention, any solute may be dissolved in the ethylene diamine or monoethanolamine which will produce a saturated solution having a freezing point or melting point between about 32° and 50° F. Therefore, when ethylene diamine is the solvent, any compound may be used as a solute which will produce a saturated eutectic mixture when the limit of solubility of the solute at the freezing temperature is less than about 8 mols per 1000 grams of solvent. Thus if the solute is soluble in the ethylene diamine only to the extent of one or two mols per 1000 grams of solvent, the freezing point of the solution will be depressed only about 2° to 6° F. However, if the solute selected is more soluble, a greater freezing point depression will be obtained. In order to provide a solution having a freezing point above about 32° F., a solute for the ethylene diamine solution should be selected which is soluble in the amine to an extent of less than about 8 mols per 1000 grams of amine. Our experiments indicate also that the molal freezing point constant of monoethanolamine is close to that which we have determined for ethylene diamine. As previously indicated, suitable solutes having the desired solubility in either ethylene diamine or ethanolamine have been found to be urea, sodium nitrite, and sodium iodide. However, it is clear that other solutes having the desired solubility characteristics may be used.

In accordance with one embodiment of this invention, a suitable heat exchange material may be prepared by dissolving one part by weight of urea in about ten parts by weight of dehydrated ethylene diamine. A mixture is thereby produced which has a melting point between about 40° and 45° F. which will be maintained throughout the period of change of state from a solid to a liquid. A quantity of this heat exchange material placed in an ordinary quart thermos bottle and solidified by heat extraction will hold a temperature between about 40° and 45° F. for a period of about 75 hours when the bottle is exposed to ordinary room temperature.

In accordance with another embodiment of this invention, a heat exchange material may be produced by adding 40 parts by weight of urea to 370 parts by weight of monoethanolamine. A material is thereby produced which is also very suitable for maintaining specimens of animal semen at a desired temperature level when the latter is placed in heat exchange relationship therewith while it is undergoing a change of state. The melting point of this material is between about 36° and 38° F.

In accordance with still another embodiment of this invention, a suitable mixture may be provided by dissolving sodium nitrite in ethylene diamine in quantities sufficient to saturate the amine with the nitrite at room temperature. The resulting saturated solution has a melting temperature between about 38° and 41° F. and if 190 grams of this solution are placed in an ordinary vacuum bottle and solidified, the temperature thereafter will remain constant at its melting point for a period of about 35 hours even though the outside room temperature is approximately 70° F.

This application is a division of our prior application Serial No. 426,488, filed January 12, 1942, now Patent No. 2,327,041.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A heat exchange material having a melting temperature between about 32° and 50° F. which remains within narrow limits during the change of state of said material from a solid to a liquid which comprises an amine selected from the group consisting of ethylene diamine and monoethanolamine and a compound dissolved therein to the point of saturation at said melting temperature to form a eutectic mixture having a substantially constant melting point within said limits, said compound being soluble in said amine to an extent of not more than about 8 mols per 1000 grams of amine at said melting temperature.

2. A eutectic mixture suitable for use as a heat exchange material having a melting temperature which remains substantially constant during the change of state thereof from solid to liquid, said melting temperature being between about 32° and 50° F., which comprises an amine selected from the group consisting of ethylene diamine and monoethanolamine and a compound dissolved therein to the point of saturation at said melting temperature, said compound being soluble in said amine to an extent of not more than about 8 mols per 1000 grams of amine at said melting temperature.

3. A eutectic mixture suitable for use as a heat exchange material having a melting temperature which remains substantially constant during the change of state thereof from solid to liquid, said melting temperature being between about 32° and 50° F., which comprises an amine selected from the group consisting of ethylene diamine and monoethanolamine admixed with a compound selected from the group consisting of urea, sodium iodide, and sodium nitrite.

4. A heat exchange material comprising a saturated solution of a compound selected from the group consisting of urea, sodium iodide and sodium nitrite dissolved in an amine selected from the group consisting of ethylene diamine and monoethanolamine.

5. A heat exchange material having a melting temperature between about 32° and 50° F. which comprises a eutectic mixture of ethylene diamine and urea.

6. A heat exchange material having a melting temperature between about 32° and 50° F. which comprises a eutectic mixture of monoethanolamine and urea.

7. A heat exchange material having a melting temperature which remains within narrow temperature limits during the change of state of said material from a solid to a liquid which comprises about one part by weight of urea dissolved in about ten parts by weight of ethylene diamine.

8. A heat exchange material having a melting temperature which remains within narrow temperature limits during the change of state of said material from a solid to a liquid which comprises about 4 parts by weight of urea dissolved in about 37 parts by weight of monoethanolamine.

9. A method of preparing a eutectic mixture suitable for use as a heat exchange material which comprises dissolving to the point of saturation a compound selected from the group consisting of urea, sodium iodide and sodium nitrite in a liquid amine selected from the group consisting of monoethanolamine and ethylene diamine, whereby a mixture is obtained having a melting temperature within narrow limits during its change of state from a solid to a liquid.

LYLE O. HILL.
LELAND W. SHORT.